3,839,463
PURIFICATION OF ORGANIC COMPOUNDS
George Theodore Cohn, Hatfield, England, assignor to
  Berk Limited, London, England
No Drawing. Filed Aug. 18, 1971, Ser. No. 172,875
Claims priority, application Great Britain, Sept. 8, 1970,
  42,999/70
Int. Cl. C07c 25/04, 39/24, 43/28
U.S. Cl. 260—612 D                                  9 Claims

ABSTRACT OF THE DISCLOSURE

A process for removing metallic impurities from solid organic compounds contaminated therewith, comprises contacting the contaminated compound with a mixture of an inorganic acid capable of dissolving the metallic impurities, an organic solvent in which the organic compound is at least partially soluble and which does not react with the acid, and water. The reaction mass is preferably agitated whilst heating under reflux. The purified organic compound is then recovered from the reaction mass. The organic liquid preferably forms an azeotrope with water so that the purified organic compound may be recovered by distilling off the azeotrope and separating the organic compound from the acid. The process is particularly applicable to the purification of nuclear-brominated aromatic compounds wherein the contaminant is a metallic catalyst which has been used for the nuclear-bromination of the aromatic compound.

---

The present invention relates to the purification of organic compounds and, more particularly, to a process for the removal of metallic impurities from solid organic compounds contaminated therewith.

Metallic catalysts, either in the form of pure metal or as a compound thereof, are widely employed in the production of aromatic compounds. One such process is the nuclear bromination of aromatic compounds by the direct action of bromine, in which catalysts such as iron, aluminium and halides thereof are employed. The resulting bromine derivatives of the aromatic compounds are generally contaminated with residues of the catalyst used and hitherto these residues have been removed by boiling the product in an inorganic acid, such as hydrochloric or dilute sulphuric acid. The catalyst residue dissolves in the acid and the brominated derivative is recovered by filtration.

This method of purification removes some of the contaminating substances, but a high degree of purity is seldom obtained and the presence of the contaminant in the brominated derivative renders it unsuitable for some applications. For instance brominated aromatic compounds are widely employed as fire retardants in organic polymers. The presence of metallic impurities, such as iron or iron halides, may produce an undesirable discolouration in the brominated derivative and when the derivative is incorporated as a fire retardant in an organic polymer, such discolouration will also be imparted to the polymer and the metallic impurities may also affect the performance of other additives, such as ultra-violet absorbers, also present in the polymer.

It is thought that the difficulties encountered in effectively removing catalyst residues from such brominated derivatives by treatment solely with an inorganic acid are due to the fact that in the course of the bromination, the derivative tends to form as an envelope around the metallic catalyst so that the resulting product comprises a mass of organic agglomerates enclosing residues of catalyst. Thus the catalyst residues are protected from the inorganic acid by a layer of organic material which is resistant to attack by the inorganic acid.

We have found that a more efficient removal of the catalyst residues can be obtained by treating the contaminated organic compound with an inorganic acid in combination with an organic solvent for the organic compound and, accordingly, the present invention provides a process for the removal of metallic impurities from solid organic compounds contaminated therewith, which comprises contacting the contaminated organic compound with a mixture of an inorganic acid capable of dissolving the metallic impurities, an organic solvent (as herein defined) for the organic compound which does not react with the acid, and water, and subsequently recovering the purified organic compound. The contaminated organic compound is preferably heated with such mixture while the whole is agitated.

Generally the metallic impurities are residues of metals or metal compounds employed as catalysts in the synthesis of the organic compound and, to ensure substantial removal of the impurities, the mixture including the contaminated organic compound is preferably heated under reflux for several hours.

The term "organic solvent" is used herein to include any organic solvent in which the organic compound is at least partially soluble. Thus, an organic solvent in which the organic compound is soluble only to the extent of, say 2–3% may be employed. In such a case it is thought that a constant equilibrium is established whereby the organic compound is continuously going into and out of solution in the organic solvent. This is sufficient to break down layers of the organic compound enclosing the metallic impurities which are thereby exposed to attack by the inorganic acid.

It is preferred to use an organic solvent which will form an azeotrope with water so that the purified organic compound can be recovered by removing the organic solvent/water azeotrope by distillation and separating the purified organic compound from the acidic solution containing the metallic impurities. The organic solvent removed by distillation may be recovered and re-used in a subsequent purification.

The process is particularly applicable to the purification of brominated aromatic compounds, such as tri- and pentabromotoluene, tetra- and hexabromobenzene, tri-, penta- and hexabromophenol, tri- and pentabromophenyl-allyl ether, and decabromodiphenyl. These compounds can be prepared by the direct action of bromine on an aromatic compound using a catalyst such as iron, aluminium of their halides. The purification of the bromine derivative obtained is preferably effected using hydrochloric or sulphuric acid as the inorganic acid and toluene, benzene, xylene, chlorobenzene or dibromoethane as the organic solvent. To further facilitate removal of the metallic impurities, it is preferable to include in the aqueous mixture a cationic or non-ionic surfactant, such as cetyltrimethylammonium-bromide or nonylphenolethylene oxide condensate, which helps to establish intimate contact between the inorganic acid and organic solvent.

The process of the present invention is particularly suitable for use as a final purification stage in processes for the production of organic compounds in which metallic catalysts are used. The crude organic product contaminated with the metallic catalyst residues can be treated directly with the inorganic acid, organic solvent and water and the selection of an organic solvent which forms an azeotrope with water ensures easy recovery of the organic solvent for use in a subsequent purification stage. The purified organic compound may then be separated from the acid containing the metallic impurities by filtration or centrifugation.

In order that the invention may be more fully understood, the following Examples, in which all parts and per-

EXAMPLE 1

200 Grams of crude wet pentabromophenol (181.4 grams dry weight; produced by the nuclear bromination of phenol with bromine in the presence of an iron catalyst and obtained in the form of a greenish-brown solid having an iron content of 3750 p.p.m.) and 262 grams water were made into a slurry and poured into a reactor provided with a motor driven stirrer and reflux condenser. The reactor was closed, a mixture of 54 grams 36% aqueous hydrochloric acid and 284 grams toluene was added, and the resulting mixture was refluxed for two hours. The apparatus was then re-arranged with a distillation head and vapour thermometer and a toluene/water azeotrope was distilled off at 86° C. When the distillation temperature rose above 86° C., the mixture was allowed to cool for 10 minutes and 145 grams of water were added. The mixture was then filtered, the solid product was washed with water and dried at 80° C.

The product consisted of light grey-brown needles and was found on analysis to have an iron content of 230 p.p.m. 172 Grams of pentabromophenol were recovered giving a percentage recovery of pentabromophenol of 95.2%.

EXAMPLE 2

The process described in Example 1 was repeated except that 300 grams chlorobenzene were used instead of 284 grams toluene and a chlorobenzene/water azeotrope was distilled off at 92° C.

The pentabromophenol product consisted of light grey-brown needles having an iron content of 23 p.p.m. 172 Grams of pentabromophenol were recovered giving a percentage recovery of pentabromophenol of 95.2%.

EXAMPLE 3

200 Grams of crude pentabromotoluene (produced by the nuclear bromination of toluene with bromine in the presence of an iron catalyst and obtained in the form of a brown solid having an iron content of 6240 p.p.m.) and 272 grams water were made into a slurry and poured into a reactor provided with a motor driven stirrer and reflux condenser. The reactor was closed, a mixture of 54 grams 36% aqueous hydrochloric acid and 300 grams chlorobenzene was added, and the resulting mixture was refluxed for five hours. The apparatus was then rearranged with a distillation head and vapour thermometer and a chlorobenzene/water azeotrope was distilled off at 92° C. When the distillation temperature rose above 92° C., the mixture was allowed to cool for ten minutes and 145 grams of water were added. The mixture was then filtered, the solid product was washed with water, and then dried.

The product was recovered as an off-white powder and was found on analysis to have an iron content of 15 p.p.m. 98% by weight of pentabromotoluene was recovered.

EXAMPLE 4

The process described in Example 3 was repeated except that 284 grams toluene was used instead of the 300 grams chlorobenzene. In addition 0.8 gram of nonylphenolethylene oxide condensate (a non-ionic surfactant sold under the trademark "Lissapol" by Imperial Chemical Industries Limited) was included in the mixture undergoing reflux. A toluene/water azeotrope was distilled off at 100° C.

Pentabromotoluene was recovered as a white powder having an iron content of 15 p.p.m. 96% by weight of pentabromotoluene was recovered.

EXAMPLE 5

The process described in Example 3 was repeated except that 310 grams xylene were used instead of the 300 grams chlorobenzene and, in addition, 0.05 gram cetyltrimethylammonium bromide, a cationic surfactant, was included in the mixture undergoing reflux. A xylene/water azeotrope was distilled off at 92° C.

The pentabromotoluene product was recovered in the form of off-white crystals having an iron content of 33 p.p.m. 93% by weight of pentabromotoluene was recovered.

EXAMPLE 6

The process described in Example 4 was repeated except that 0.3 gram cetyltrimethylammonium bromide was used instead of the 0.8 gram "Lissapol." The pentabromotoluene product was recovered as an off-white powder having an iron content of 120 p.p.m. 79.5% by weight of pentabromotoluene was recovered.

I claim:

1. A process for the removal of metallic impurities from a solid nuclear-brominated aromatic organic compound contaminated with said impurities, which comprises contacting said contaminated organic compound with hydrochloric acid or sulfuric acid in the presence of water and an organic solvent in which said organic compound is at least partially soluble and which will not react with said acid to thereby facilitate attack of said metallic impurities by the acid and dissolution therein, then distilling the reaction mixture and recovering the brominated aromatic organic compound from the residue by filtration or centrifugation.

2. A process according to Claim 1, wherein the organic compound is heated with said mixture while the whole is agitated.

3. A process according to Claim 1, wherein said organic solvent is capable of forming an azeotrope with water and the purified organic compound is recovered by removing the organic solvent/water azeotrope by distillation and separating the purified organic compound from the acidic solution containing the metallic impurities.

4. A process according to Claim 3, wherein said organic solvent is selected from the group consisting of toluene, benzene, xylene, chlorobenzene and dibromoethane.

5. A process according to Claim 1, wherein said mixture additionally comprises a surfactant selected from the group consisting of cationic and non-ionic surfactants.

6. A process according to Claim 5, wherein said surfactant is selected from the group consisting of cetyltrimethylammonium bromide and nonylphenolethylene oxide condensate.

7. A process according to Claim 1, wherein the metallic impurity therein is the residue of a metallic catalyst used in the nuclear bromination of the aromatic compound.

8. A process according to Claim 1, wherein said solid organic compound is a nuclear-brominated aromatic compound selected from the group consisting of tri- and penta-bromo-toluene, tetra- and hexa-bromobenzene, penta- and hexa-bromophenol, tri- and penta-bromophenyl-allyl ether, and decabromodiphenyl, and the metallic impurity present therein is the residue of a metallic catalyst selected from the group consisting of iron and aluminum and halides therefo, said catalyst having been used in the nuclear bromination of the aromatic compound.

9. A process according to Claim 8, wherein the organic solvent is selected from the group consisting of toluene, benzene, xylene, chlorobenzene and dibromoethane, and said contacting step is carried out at the reflux temperature of the mixture.

References Cited

UNITED STATES PATENTS 2,319,960　5/1943　Treacy _____ 260—623 H

FOREIGN PATENTS 934,970　8/1963　Great Britain _____ 260—623 H

BERNARD HELFIN, Primary Examiner

W. B. LONE, Assistant Examiner

U.S. Cl. X.R.

260—623 R, 649 D, 650 R